United States Patent
Sato

(10) Patent No.: US 11,459,974 B2
(45) Date of Patent: Oct. 4, 2022

(54) FUEL INJECTION CONTROL DEVICE

(71) Applicant: SUBARU CORPORATION, Tokyo (JP)

(72) Inventor: Ko Sato, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/234,028

(22) Filed: Apr. 19, 2021

(65) Prior Publication Data

US 2021/0355890 A1    Nov. 18, 2021

(30) Foreign Application Priority Data

May 12, 2020    (JP) .............................. JP2020-084021

(51) Int. Cl.
*F02D 41/40*    (2006.01)
*F02D 41/02*    (2006.01)
*F02D 41/00*    (2006.01)
*F01N 3/08*    (2006.01)

(52) U.S. Cl.
CPC ......... *F02D 41/405* (2013.01); *F01N 3/0814* (2013.01); *F02D 41/0082* (2013.01); *F02D 41/029* (2013.01); *F02D 41/0235* (2013.01); *F02D 41/401* (2013.01); *F01N 2430/085* (2013.01)

(58) Field of Classification Search
CPC ............. F02D 41/0082; F02D 41/0235; F02D 41/029; F02D 41/401; F02D 41/405; F01N 3/0814; F01N 2430/085
See application file for complete search history.

(56) References Cited

U.S. PATENT DOCUMENTS

2021/0095607 A1*    4/2021    Fulton ................. F02D 41/1497

FOREIGN PATENT DOCUMENTS

JP    2007-023888 A    2/2007

* cited by examiner

*Primary Examiner* — Audrey B. Walter
(74) *Attorney, Agent, or Firm* — McDermott Will & Emery LLP

(57) ABSTRACT

A vehicle includes an exhaust passage including an exhaust cleaner, an engine coupled to the exhaust passage, fuel injection valves, and a control device. The fuel injection valves are respectively provided in cylinders of the engine and inject fuel into the cylinders. The control device performs, after main-injection, post-injection control that causes the fuel injection valves to perform post-injection. The control device determines a fuel injection amount for single-time post-injection performed by each fuel injection valve such that the fuel injection amount for the single-time post-injection is greater than a fuel injection amount when the post-injection is performed in every combustion cycle in all the cylinders. The control device performs the post-injection control such that how many times the post-injection is performed is less than how many times the post-injection is performed in a case in which the post-injection is performed in every combustion cycle in all the cylinders.

4 Claims, 4 Drawing Sheets

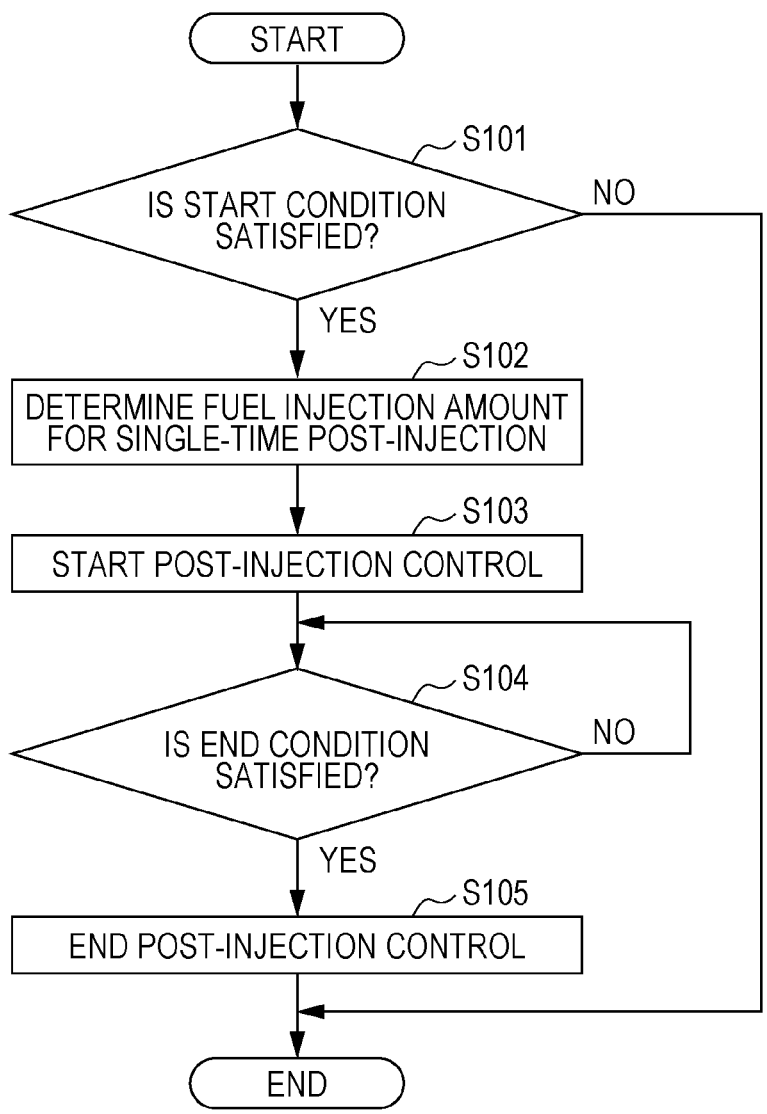

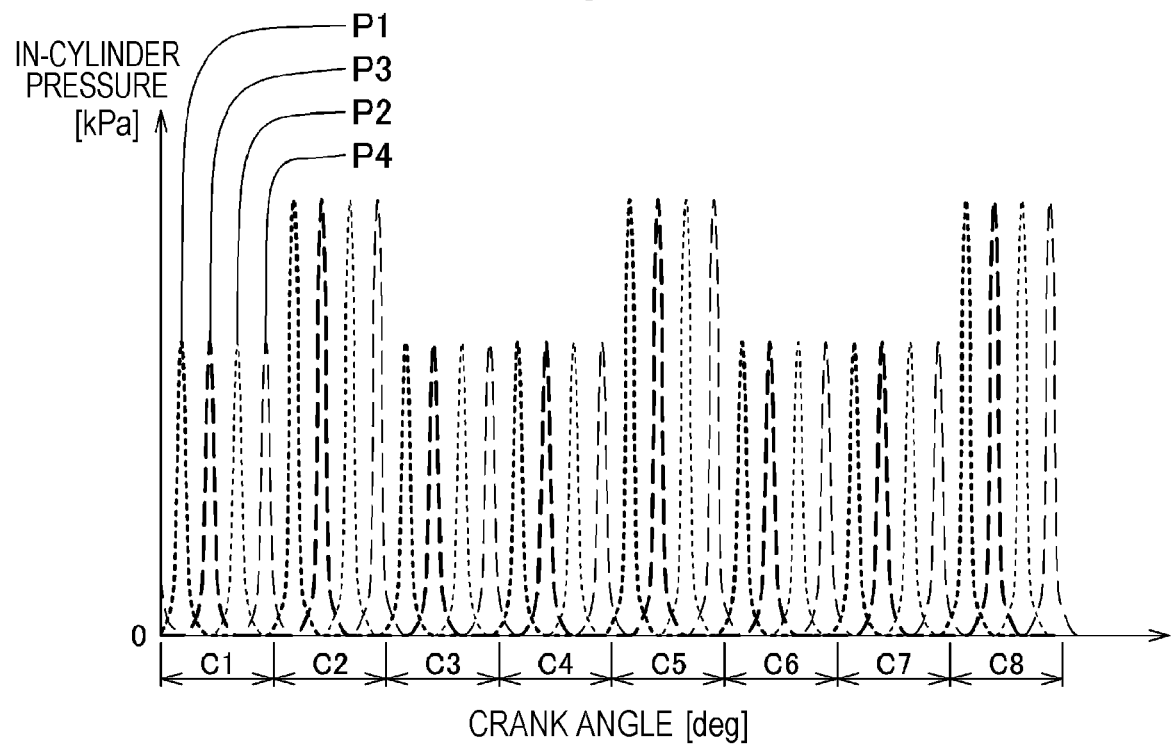
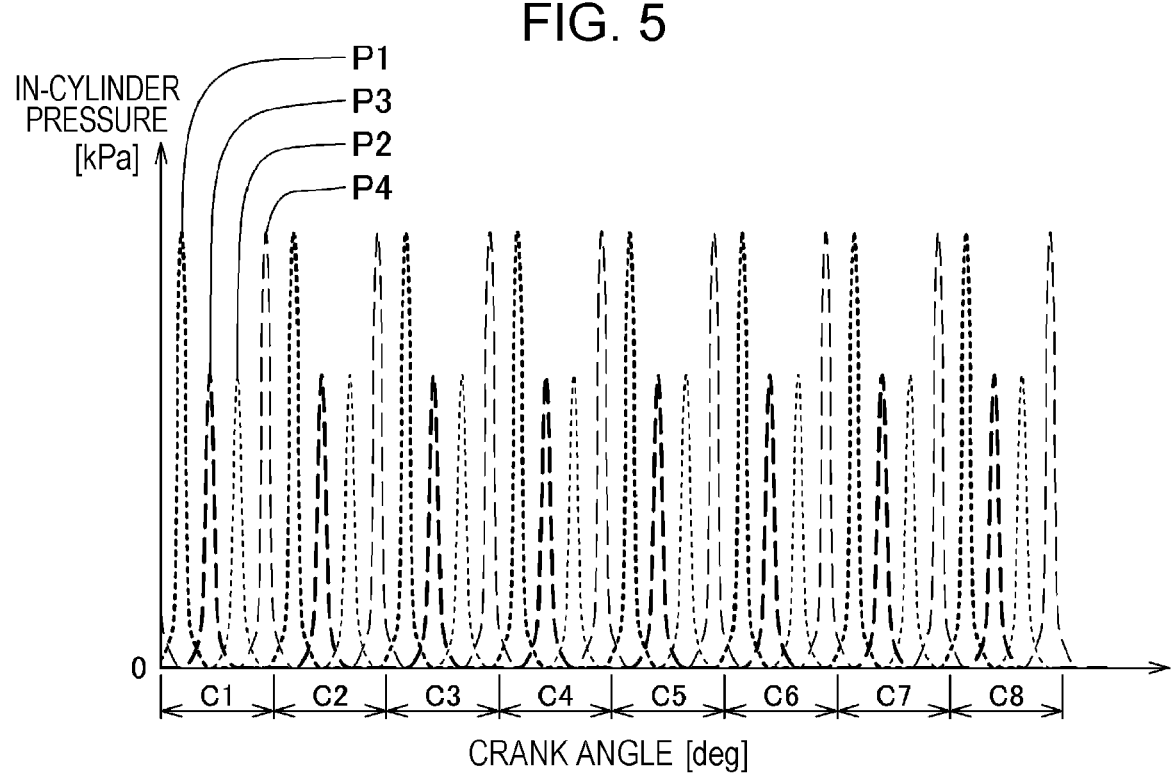

FUEL INJECTION CONTROL DEVICE

CROSS-REFERENCE TO RELATED APPLICATIONS

The present application claims priority from Japanese Patent Application No. 2020-084021 filed on May 12, 2020, the entire contents of which are hereby incorporated by reference.

BACKGROUND

The disclosure relates to a vehicle.

Exhaust gas emitted from the engine flows through an exhaust passage, and the exhaust passage is provided with an exhaust cleaner including a catalyst for cleaning harmful components in the exhaust gas (e.g., an NOx adsorber catalyst that can adsorb NOx (i.e., nitrogen oxide) in the exhaust gas). The cleaning performance of the catalyst in the exhaust cleaner tends to decrease over time. For example, the NOx adsorber catalyst adsorbs NOx in the exhaust gas and also SOx (i.e., sulfur oxide) in the exhaust gas. As the amount of NOx or SOx adsorbed on the NOx adsorber catalyst increases over time, the cleaning performance of the NOx adsorber catalyst decreases. Accordingly, for example, as disclosed in Japanese Unexamined Patent Application Publication No. 2007-023888, the following technique is proposed. Post-injection for injecting fuel after main-injection (e.g., during an exhaust stroke) is performed, and thereby, the atmosphere in the catalyst is made a rich atmosphere (i.e., an atmosphere with a lower air/fuel ratio than the stoichiometry), and, for example, NOx is reduced. Thus, the cleaning performance of the catalyst such as the NOx adsorber catalyst is recovered.

SUMMARY

An aspect of the disclosure provides a vehicle including an exhaust passage, an engine, fuel injection valves, and a control device. The exhaust passage is provided with an exhaust cleaner. The engine is coupled to the exhaust passage. The fuel injection valves are respectively provided cylinders of the engine and configured to inject fuel into the cylinders. The control device is configured to perform post-injection control that causes the fuel injection valves to perform post-injection in addition to main-injection. The post-injection is fuel injection performed after the main-injection. The control device includes an injection-amount determiner and an injection-valve controller. The injection-amount determiner is configured to determine a fuel injection amount for single-time post-injection performed by each of the fuel injection valves such that the fuel injection amount for the single-time post-injection is greater than a fuel injection amount in a case in which the post-injection is performed in every combustion cycle in all the cylinders. The injection-valve controller is configured to perform the post-injection control such that how many times the post-injection is performed is less than how many times the post-injection is performed in a case in which the post-injection is performed in every combustion cycle in all the cylinders.

An aspect of the disclosure provides a vehicle including an exhaust passage, an engine, fuel injection valves, and circuitry. The exhaust passage is provided with an exhaust cleaner. The engine is coupled to the exhaust passage. The fuel injection valves are respectively provided in cylinders of the engine and configured to inject fuel into the cylinders. The circuitry is configured to perform post-injection control that causes the fuel injection valves to perform post-injection in addition to main-injection. The post-injection is fuel injection performed after the main-injection. The circuitry is determine a fuel injection amount for single-time post-injection performed by each of the fuel injection valves such that the fuel injection amount for the single-time post-injection is greater than a fuel injection amount in a case in which the post-injection is performed in every combustion cycle in all the cylinders. The circuitry is perform the post-injection control such that how many times the post-injection is performed is less than how many times the post-injection is performed in a case in which the post-injection is performed in every combustion cycle in all the cylinders.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 3 is a flowchart illustrating an example of a flow of a process concerning post-injection control performed by the control device according to the embodiment of the disclosure;

FIG. 4 schematically illustrates an example of transition of in-cylinder pressures during the post-injection control according to the embodiment of the disclosure; and FIG. 5 schematically illustrates an example of transition of in-cylinder pressures during the post-injection control in which timings for performing post-injection differ from those in the example in FIG. 4 according to the embodiment of the disclosure.

DETAILED DESCRIPTION

As the purpose of the post-injection described above differs from the purpose of the main-injection, that is, not injection of fuel to be used for combustion in cylinders, the fuel injection amount for single-time post-injection is smaller than the fuel injection amount for single-time main-injection. In general, in the control of fuel injection valves, it is difficult to accurately control an excessively small fuel injection amount. Thus, in the related art, the fuel injection amount for the post-injection has not been accurately controlled and may be excessively large or excessively small.

It is desirable to provide a vehicle in which the fuel injection amount for the post-injection can be accurately controlled.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

The configuration of a vehicle 1 according to an embodiment of the disclosure will be described with reference to FIG. 1 and FIG. 2.

Figure 1:
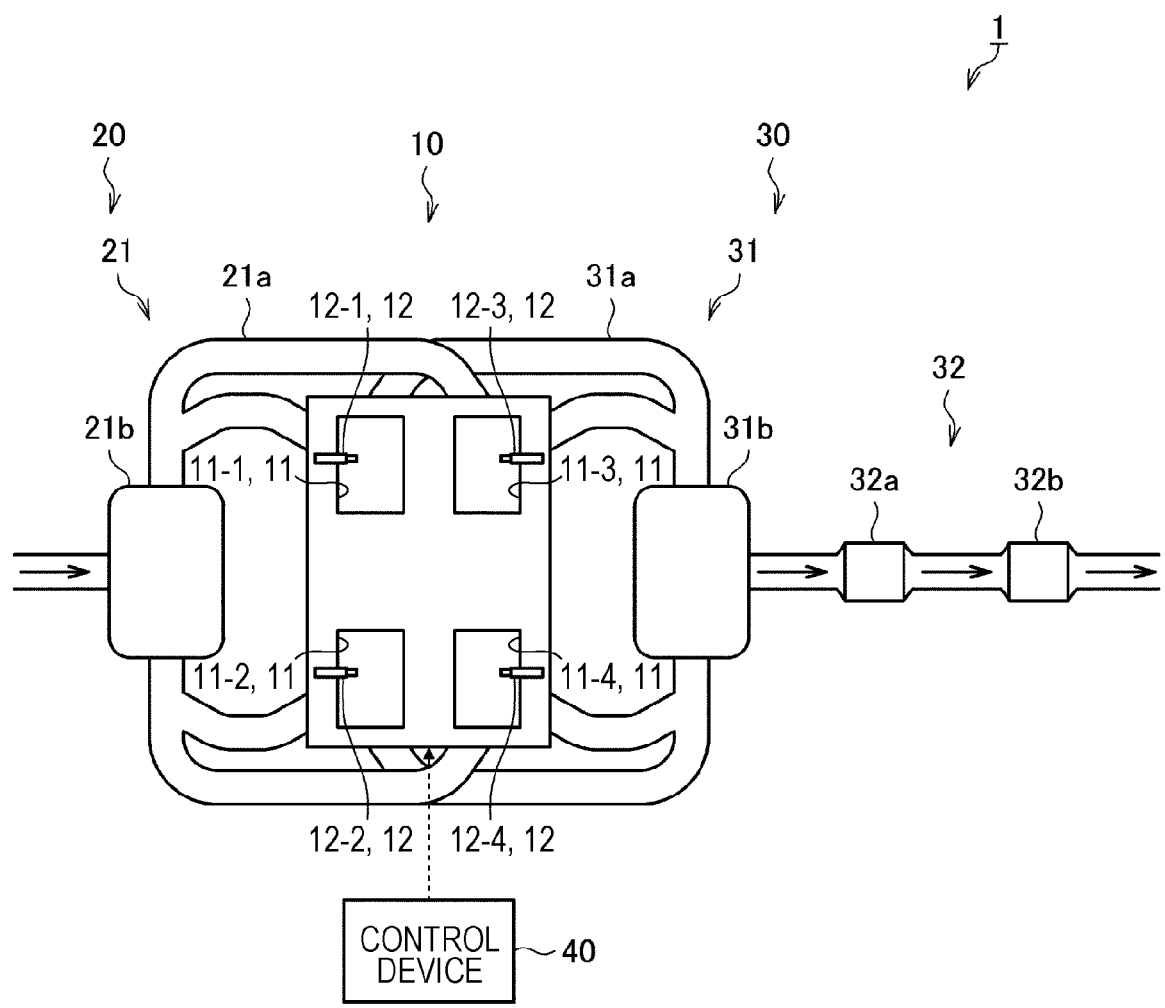
FIG. 1 schematically illustrates the configuration of a vehicle according to an embodiment of the disclosure.

FIG. 1 schematically illustrates the configuration of the vehicle 1. As illustrated in FIG. 1, the vehicle 1 includes an engine 10, an intake passage 20, an exhaust passage 30, and a control device 40.

The engine 10 is a spark-ignition internal combustion engine (i.e., gasoline engine). The engine 10 includes a plurality of cylinders 11. In one example, the engine 10 is a horizontally opposed engine including four cylinders 11, which are a cylinder 11-1, a cylinder 11-2, a cylinder 11-3, and a cylinder 11-4. The cylinder 11-1 and the cylinder 11-3 are formed on a bank in the right-left direction of the vehicle in the engine 10, whereas the cylinder 11-2 and the cylinder 11-4 are formed on the other bank in the right-left direction of the vehicle in the engine 10. The cylinder 11-1, the cylinder 11-3, the cylinder 11-2, and the cylinder 11-4 are ignited in this order in the engine 10.

Each of the cylinders 11 is provided with a fuel injection valve 12 for injecting fuel into the cylinder 11. In one example, the cylinder 11-1, the cylinder 11-2, the cylinder 11-3, and the cylinder 11-4 are provided with a fuel injection valve 12-1, a fuel injection valve 12-2, a fuel injection valve 12-3, and a fuel injection valve 12-4, respectively. In each of the cylinders 11, a piston (omitted from illustration) is provided in a slidable manner, and the piston forms a fuel chamber. The fuel injected from the fuel injection valve 12 forms a mixed air containing air and fuel, and ignition by an ignition plug (omitted from illustration) burns the mixed air. This causes linear reciprocation of the piston, and power is transmitted to a crankshaft (omitted from illustration) coupled to the piston.

The intake passage 20 is a passage through which air flows to be supplied to each of the cylinders 11. The intake passage 20 couples the engine 10 and an air intake from which the outside air is taken from the outside of the vehicle 1. On the downstream side of the intake passage 20, an intake manifold 21 is provided. The intake manifold 21 branches toward the cylinders 11 and is coupled to the cylinders 11. In one example, the intake manifold 21 includes a plurality of intake pipes 21a coupled to intake ports of the respective cylinders 11 and a converging section 21b where the plurality of intake pipes 21a communicate. The outside air taken from the air intake is sent to the converging section 21b of the intake manifold 21 and is then supplied through the intake pipes 21a to the cylinders 11.

The exhaust passage 30 is a passage through which exhaust gas emitted from each of the cylinders 11 flows. The exhaust passage 30 couples the engine 10 and an air exhaust from which exhaust gas is emitted to the outside of the vehicle 1. On the upstream side of the exhaust passage 30, an exhaust manifold 31 is provided. The exhaust manifold 31 branches toward the cylinders 11 and is coupled to the cylinders 11. In one example, the exhaust manifold 31 includes a plurality of exhaust pipes 31a coupled to exhaust ports of the respective cylinders 11 and a converging section 31b where the plurality of exhaust pipes 31a communicate.

On the downstream side of the exhaust manifold 31 in the exhaust passage 30, an exhaust cleaner 32 is provided. The exhaust cleaner 32 includes a three-way catalyst 32a and an NOx adsorber catalyst 32b that is provided on the downstream side of the three-way catalyst 32a. The exhaust gas emitted from the cylinders 11 passes through the exhaust pipes 31a of the exhaust manifold 31 and converges in the converging section 31b and then sequentially passes through the three-way catalyst 32a and the NOx adsorber catalyst 32b to be emitted through the air exhaust to the outside of the vehicle 1.

The three-way catalyst 32a includes, for example, a carrier on which platinum (Pt), palladium (Pd), or rhodium (Rh) is supported. The three-way catalyst 32a oxidizes hydrocarbon (HC), oxidizes carbon monoxide (CO), and reduces NOx in the exhaust gas, thereby cleaning these harmful components in the exhaust gas into less harmful water vapor ($H_2O$), carbon dioxide ($CO_2$), and nitrogen ($N_2$).

The NOx adsorber catalyst 32b includes, for example, a carrier on which platinum (Pt), palladium (Pd), rhodium (Rh), barium (Ba), or potassium (K) is supported. The NOx adsorber catalyst 32b is a catalyst that can adsorb NOx in the exhaust gas. Herein, if the atmosphere in the three-way catalyst 32a is a lean atmosphere (i.e., an atmosphere with a higher air/fuel ratio than the stoichiometry), most of NOx in the exhaust gas reaches the NOx adsorber catalyst 32b without being cleaned in the three-way catalyst 32a. In the exhaust cleaner 32, NOx that passes through the three-way catalyst 32a without being cleaned as described above is adsorbed on the NOx adsorber catalyst 32b.

The control device 40 controls the operation of the engine 10. In one example, the control device 40 controls the operation of the fuel injection valves 12 provided in the engine 10. Note that the communication between the control device 40 and each device of the engine 10 is implemented by using, for example, controller area network (CAN) communication.

The control device 40 includes, for example, a central processing unit (CPU) serving as an arithmetic processor, a read-only memory (ROM) serving as a storage that stores programs and arithmetic parameters to be used by the CPU, and a random access memory (RAM) serving as a storage that temporarily stores parameters that appropriately change in a process executed by the CPU.

Note that the functions of the control device 40 according to this embodiment may be divided to a plurality of controllers, and a plurality of functions may be implemented by a single controller. If the functions of the control device 40 are divided to a plurality of controllers, the plurality of controllers may be connected to each other via a communication bus such as CAN.

Figure 2:
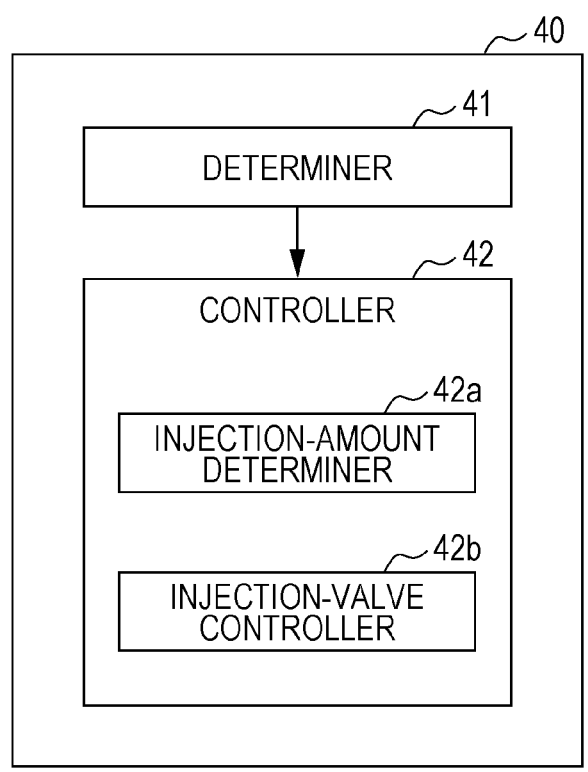
FIG. 2 is a block diagram illustrating an example of a functional configuration of a control device according to the embodiment of the disclosure.

FIG. 2 is a block diagram illustrating an example of a functional configuration of the control device 40. As illustrated in FIG. 2, the control device 40 includes, for example, a determiner 41 and a controller 42.

The determiner 41 performs various determinations and outputs the determination results to the controller 42. In accordance with the determination results obtained by the determiner 41, the controller 42 performs a process.

The controller 42 controls a fuel injection amount and a fuel injection timing of the fuel injection valves 12. For example, the controller 42 includes an injection-amount determiner 42a and an injection-valve controller 42b.

The injection-amount determiner 42a determines the fuel injection amount for single-time fuel injection performed by each of the fuel injection valves 12. For example, on the basis of a requested torque of the engine 10, the injection-amount determiner 42a determines the fuel injection amount for single-time main-injection performed by each of the fuel injection valves 12 (i.e., injection of fuel to be used for combustion in the cylinders 11 in order to cause the engine 10 to output a desired torque).

The injection-valve controller 42b outputs a command signal for the fuel injection timing and the fuel injection amount to each of the fuel injection valves 12 such that the fuel injection valve 12 performs fuel injection at a desired fuel injection timing with a desired fuel injection amount (in one example, the fuel injection amount determined by the injection-amount determiner 42a).

Herein, as injection control serving as the control of fuel injection performed by the fuel injection valve 12, the control device 40 can perform normal injection control and post-injection control.

The normal injection control is injection control for causing the fuel injection valve 12 to perform the main-injection alone. The main-injection is, as described above, injection of fuel to be used for combustion in the cylinders 11 in order to cause the engine 10 to output a desired torque. For example, the main-injection is performed during an intake stroke.

The post-injection control is injection control for causing the fuel injection valve 12 to perform post-injection in addition to the main-injection. The post-injection is fuel injection performed after the main-injection in order to recover the cleaning performance of the NOx adsorber catalyst 32b. For example, the post-injection is performed during an expansion stroke or an exhaust stroke.

As the amount of adsorbed NOx increases over time, the cleaning performance of the NOx adsorber catalyst 32b decreases. If the post-injection is performed herein, fuel injected by the post-injection is sent to the exhaust passage 30, and the atmosphere in the NOx adsorber catalyst 32b becomes a rich atmosphere. Then, NOx adsorbed on the NOx adsorber catalyst 32b is reduced, and the amount of adsorbed NOx decreases. Accordingly, the cleaning performance of the NOx adsorber catalyst 32b that has decreased as a result of increase in the amount of adsorbed NOx can be recovered.

In addition to NOx in the exhaust gas, SOx is also adsorbed on the NOx adsorber catalyst 32b. As the amount of adsorbed SOx increases over time, the area in the NOx adsorber catalyst 32b where NOx can be adsorbed is reduced, and the cleaning performance of the NOx adsorber catalyst 32b decreases. If the post-injection is performed herein, fuel injected by the post-injection is combusted in the three-way catalyst 32a, and the temperature of the NOx adsorber catalyst 32b increases. In addition, as described above, the atmosphere in the NOx adsorber catalyst 32b becomes a rich atmosphere. Then, SOx adsorbed on the NOx adsorber catalyst 32b is desorbed as sulfur dioxide ($SO_2$) or hydrogen sulfide ($H_2S$), and the amount of adsorbed SOx decreases. Accordingly, the cleaning performance of the NOx adsorber catalyst 32b that has decreased as a result of increase in the amount of adsorbed SOx can be recovered.

In the control device 40 according to this embodiment, the injection-amount determiner 42a determines the fuel injection amount for single-time post-injection performed by each of the fuel injection valves 12 to be greater than the fuel injection amount in a case in which the post-injection is performed in every combustion cycle in all the cylinders 11. Then, the injection-valve controller 42b performs the post-injection control such that the number of times of the post-injection is less than the number of times in a case in which the post-injection is performed in every combustion cycle in all the cylinders 11. Thus, the fuel injection amount for the post-injection can be accurately controlled. Note that details of a process concerning the post-injection control performed by the control device 40 will be described later.

Vehicle Operation Next, the operation of the vehicle 1 according to an embodiment of the disclosure will be described with reference to FIG. 3 to FIG. 5.

FIG. 3 is a flowchart illustrating an example of a flow of the process concerning the post-injection control performed by the control device 40. Note that the control flow illustrated in FIG. 3 is started when the post-injection control is not performed (i.e., during execution of the normal injection control). In addition, after the control flow illustrated in FIG. 3 has ended, the control flow illustrated in FIG. 3 is repeatedly started.

At the start of the control flow illustrated in FIG. 3, first, in step S101, the determiner 41 determines whether a start condition of the post-injection control is satisfied. If it is determined that the start condition is satisfied (step S101/YES), the process proceeds to step S102. On the other hand, if it is determined that the start condition is not satisfied (step S101/NO), the control flow illustrated in FIG. 3 ends.

The start condition of the determination process in step S101 is, for example, that the traveling distance of the vehicle 1 from the last execution of the post-injection control reaches a reference distance. The reference distance is set to a distance by which it can be appropriately determined whether the cleaning performance has decreased to a level at which the cleaning performance of the NOx adsorber catalyst 32b is to be recovered. Alternatively, for example, the start condition may be that the traveling time of the vehicle 1 from the last execution of the post-injection control reaches a reference time. The reference time is set to a time by which it can be appropriately determined whether the cleaning performance has decreased to a level at which the cleaning performance of the NOx adsorber catalyst 32b is to be recovered.

Note that the start condition of the determination process in step S101 may be a start condition that is set for the post-injection control to recover the cleaning performance of the NOx adsorber catalyst 32b by the reduction of NOx (i.e., NOx purge) or may be a start condition that is set for the post-injection control to recover the cleaning performance of the NOx adsorber catalyst 32b by the desorption of SOx (i.e., SOx purge).

If it is determined in step S101 as YES, in step S102, the injection-amount determiner 42a determines the fuel injection amount for single-time post-injection performed by each of the fuel injection valves 12.

In one example, the injection-amount determiner 42a divides the total amount of fuel to be injected by all post-injection performed in a unit time by the number of times of post-injection performed in a unit time during the post-injection control. Then, the injection-amount determiner 42a determines the value obtained by the division to be the fuel injection amount for single-time post-injection performed by each of the fuel injection valves 12.

As described above, the number of times of post-injection during the post-injection control according to this embodiment is less than the number of times in a case in which the post-injection is performed in every combustion cycle in all the cylinders 11. Accordingly, the injection-amount determiner 42a determines the fuel injection amount for single-time post-injection performed by each of the fuel injection valves 12 to be greater than the fuel injection amount in a case in which the post-injection is performed in every combustion cycle in all the cylinders 11. This can prevent the fuel injection amount for single-time post-injection from becoming excessively small, and thus, the fuel injection amount for the post-injection can be accurately controlled. That is, the fuel injection amount for the post-injection can be prevented from becoming excessively large or excessively small.

Subsequently, in step S103, the injection-valve controller 42b starts the post-injection control.

As described above, during the post-injection control, the injection-valve controller 42b causes the fuel injection valve 12 to perform the post-injection in addition to the main-injection. In addition, the injection-valve controller 42b performs the post-injection control such that the number of times of the post-injection is less than the number of times in a case in which the post-injection is performed in every combustion cycle in all the cylinders 11.

Now, an example of timings for performing the post-injection during the post-injection control will be described with reference to FIG. 4. FIG. 4 schematically illustrates an example of transition of in-cylinder pressures during the post-injection control.

FIG. 4 illustrates eight consecutive combustion cycles, which are combustion cycles C1, C2, C3, C4, C5, C6, C7, and C8. In each combustion cycle, four strokes, which are an intake stroke, a compression stroke, an expansion stroke, and an exhaust stroke, are performed in each cylinder 11 at timings shifted from those in the other cylinders 11. In the example illustrated in FIG. 4, in each combustion cycle, the cylinder 11-1, the cylinder 11-3, the cylinder 11-2, and the cylinder 11-4 are ignited in this order. Accordingly, as illustrated in FIG. 4, an in-cylinder pressure P1, which is the pressure in the cylinder 11-1, an in-cylinder pressure P3, which is the pressure in the cylinder 11-3, an in-cylinder pressure P2, which is the pressure in the cylinder 11-2, and an in-cylinder pressure P4, which is the pressure in the cylinder 11-4, increase in this order.

Herein, although most of fuel injected by the post-injection is sent to the exhaust passage 30 together with the exhaust gas emitted from the cylinders 11, part of fuel injected by the post-injection remains in the cylinders 11 as unburned gas. Accordingly, in a cylinder 11 in which the post-injection is performed, the torque generated by combustion following the post-injection is greater than that in a case in which the post-injection is not performed previously. Thus, the increase degree of the in-cylinder pressures caused by combustion following the post-injection is greater than that in a case in which the post-injection is not performed previously.

In the example illustrated in FIG. 4, during the post-injection control, the injection-valve controller 42b stops the post-injection in some combustion cycles. In one example, during the post-injection control, the injection-valve controller 42b performs the post-injection every plurality of cycles that are set.

For example, in the example illustrated in FIG. 4, the injection-valve controller 42b performs the post-injection in all the cylinders 11 in the combustion cycle C1 that precedes the combustion cycle C2, in the combustion cycle C4 that precedes the combustion cycle C5, and in the combustion cycle C7 that precedes the combustion cycle C8. On the other hand, the injection-valve controller 42b stops the post-injection in all the cylinders 11 in the combustion cycle C2, the combustion cycle C3, the combustion cycle C5, the combustion cycle C6, and the combustion cycle C8. Accordingly, in the combustion cycle C2, the combustion cycle C5, and the combustion cycle C8, the increase degree of the pressures in all the cylinders 11, which are the in-cylinder pressures P1 to P4, is greater than that in the other combustion cycles. That is, the injection-valve controller 42b performs the post-injection every three cycles.

Note that the post-injection is performed every three cycles during the post-injection control in the example illustrated in FIG. 4. However, the combustion cycles in which the post-injection is stopped during the post-injection control are not limited to this example. For example, the post-injection may be performed every cycles the number of which is other than three (e.g., every two cycles or every four cycles) during the post-injection control. In addition, for example, intervals between combustion cycles in which the post-injection is performed during the post-injection control are not necessarily equal (i.e., the number of combustion cycles in which the post-injection is stopped between combustion cycles in which the post-injection is performed is not necessarily fixed).

As described above, since part of fuel injected by the post-injection remains in the cylinders 11 as unburned gas, the increase degree of the in-cylinder pressures caused by combustion following the post-injection is greater than that in a case in which the post-injection is not performed previously. Such a fluctuation of the in-cylinder pressures increases rotation fluctuation (i.e., rotation speed fluctuation) of the engine 10. Accordingly, the injection-valve controller 42b preferably performs a process for suppressing the rotation fluctuation of the engine 10 as a result of the post-injection.

For example, to suppress the rotation fluctuation of the engine 10, the injection-valve controller 42b performs the post-injection during the post-injection control at a timing corresponding to the start of an exhaust stroke (e.g., at a timing that is substantially the same as the start of an exhaust stroke). Performing the post-injection at the same time or substantially the same time as the start of an exhaust stroke in the above manner can increase the ratio of fuel to be sent to the exhaust passage 30 together with the exhaust gas emitted from the cylinders 11 to fuel that is injected by the post-injection. This can reduce the amount of unburned gas that remains in the cylinders 11 by the post-injection (hereinafter also referred to as post-injection unburned remaining gas). Accordingly, since the increase degree of the in-cylinder pressures by combustion following the post-injection can be reduced, the fluctuation of the in-cylinder pressures can be suppressed. Thus, the rotation fluctuation of the engine 10 can be suppressed.

In addition, for example, to suppress the rotation fluctuation of the engine 10, during the post-injection control, the injection-valve controller 42b retards an ignition timing (in one example, an ignition timing in a combustion cycle following a combustion cycle in which the post-injection is performed) in accordance with the amount of post-injection unburned remaining gas. Since the ignition timing in a combustion cycle following a combustion cycle in which the post-injection is performed is retarded herein, the start timing of the increase in the in-cylinder pressures caused by combustion following the post-injection can be retarded, and thus, the increase degree of the in-cylinder pressures can be reduced. Furthermore, the greater the amount of post-injection unburned remaining gas, the greater the increase degree of the in-cylinder pressures caused by combustion following the post-injection. Accordingly, for example, as the amount of post-injection unburned remaining gas is greater, the injection-valve controller 42b increases the retardation amount of the ignition timing in a combustion cycle following a combustion cycle in which the post-injection is performed. Thus, since the increase degree of the in-cylinder pressures caused by combustion following the post-injection can be appropriately reduced in accordance with the amount of post-injection unburned remaining gas, the fluctuation of the in-cylinder pressures can be suppressed. Therefore, the rotation fluctuation of the engine 10 can be suppressed.

Furthermore, for example, to suppress the rotation fluctuation of the engine 10, during the post-injection control, the injection-valve controller 42b reduces a fuel injection amount for the main-injection (in one example, a fuel injection amount for the main-injection in a combustion cycle following a combustion cycle in which the post-injection is performed) in accordance with the amount of post-injection unburned remaining gas. The fuel injection amount for the main-injection in a combustion cycle following a combustion cycle in which the post-injection is performed is reduced herein, and thus, the increase degree of the in-cylinder pressures caused by combustion following the post-injection can be reduced. Accordingly, for example, as the amount of post-injection unburned remaining gas is greater, the injection-valve controller 42b increases the reduction amount of fuel injection amount for the main-injection in a combustion cycle following a combustion cycle in which the post-injection is performed. Thus, since the increase degree of the in-cylinder pressures caused by combustion following the post-injection can be appropriately reduced in accordance with the amount of post-injection unburned remaining gas, the fluctuation of the in-cylinder pressures can be suppressed. Therefore, the rotation fluctuation of the engine 10 can be suppressed.

Note that the amount of unburned gas that remains in the cylinders 11 by the post-injection (i.e., the post-injection unburned remaining gas) can be estimated, for example, on the basis of results of experiment or numerical simulation that is performed in advance.

Subsequently, in step S104, the determiner 41 determines whether an end condition of the post-injection control is satisfied. If it is determined that the end condition is satisfied (step S104/YES), the process proceeds to step S105. On the other hand, if it is determined that the end condition is not satisfied (step S104/NO), the determination process in step S104 is repeated.

The end condition of the determination process in step S104 is, for example, that a set time has elapsed from the start of the post-injection control. The set time is set to a time by which it can be appropriately determined whether the cleaning performance of the NOx adsorber catalyst 32b, which has decreased by increase in the amount of adsorbed NOx or increase in the amount of adsorbed SOx is sufficiently recovered by the post-injection control.

If it is determined in step S104 as YES, in step S105, the injection-valve controller 42b ends the post-injection control, and the control flow illustrated in FIG. 3 ends.

The example of timings for performing the post-injection during the post-injection control is described above with reference to FIG. 4. However, the timings for performing the post-injection during the post-injection control are not limited to the above example.

Now, another example of timings for performing the post-injection that can suppress the rotation fluctuation of the engine 10 will be described with reference to FIG. 5. FIG. 5 schematically illustrates an example of transition of in-cylinder pressures during the post-injection control in which timings for performing the post-injection differ from those in the example in FIG. 4.

In the example illustrated in FIG. 5, unlike in the example illustrated in FIG. 4, the injection-valve controller 42b stops the post-injection in some cylinders 11 in each combustion cycle during the post-injection control. In this example, the injection-valve controller 42b stops the post-injection in the same cylinders 11 in each combustion cycle during the post-injection control.

For example, in the example illustrated in FIG. 5, in each combustion cycle, the injection-valve controller 42b performs the post-injection in the cylinder 11-1 and the cylinder 11-4, whereas the injection-valve controller 42b stops the post-injection in the cylinder 11-3 and the cylinder 11-2. Accordingly, in each combustion cycle, the increase degree of the in-cylinder pressure P1 and the in-cylinder pressure P4 is greater than the increase degree of the in-cylinder pressure P3 and the in-cylinder pressure P2. That is, the post-injection is stopped in some cylinders 11 in each combustion cycle, and the cylinders 11 in which the post-injection is stopped are the same in each combustion cycle. That is, the post-injection is stopped in some cylinders 11 in each combustion cycle, and the post-injection is stopped in the same cylinders 11 in each combustion cycle.

In a case in which the post-injection is stopped in some cylinders 11 in each combustion cycle during the post-injection control, as in the example illustrated in FIG. 5, the period of fluctuation of the in-cylinder pressures is shorter than that in a case in which the post-injection is stopped in some combustion cycles (e.g., the example illustrated in FIG. 4). For example, in the example illustrated in FIG. 4, the in-cylinder pressures do not substantially fluctuate at least in one combustion cycle. On the other hand, in the example illustrated in FIG. 5, in a combustion cycle, since there are both cylinders 11 in which the post-injection is performed and cylinders 11 in which the post-injection is not performed in the preceding combustion cycle, the in-cylinder pressures greatly fluctuate. Accordingly, in the example illustrated in FIG. 5, the period of fluctuation of the in-cylinder pressures is shorter than that in the example illustrated in FIG. 4. Thus, since the number of vibrations of the in-cylinder pressures can be increased with respect to the characteristic vibration of the engine 10 or various parts attached to the engine 10, the rotation fluctuation of the engine 10 can be suppressed.

Note that the post-injection is stopped in the same cylinders 11 in each combustion cycle during the post-injection control in the example illustrated in FIG. 5. However, the post-injection may be stopped in different cylinders 11 in each combustion cycle during the post-injection control. For example, during the post-injection control, there may be both a combustion cycle in which the post-injection is stopped in the cylinder 11-3 and the cylinder 11-2 and a combustion cycle in which the post-injection is stopped in the cylinder 11-1 and the cylinder 11-4.

Effects of Vehicle

Next, effects of the vehicle 1 according to an embodiment of the disclosure will be described.

In the vehicle 1 according to this embodiment, the control device 40 includes the injection-amount determiner 42a and the injection-valve controller 42b. The injection-amount determiner 42a determines the fuel injection amount for single-time post-injection performed by each of the fuel injection valves 12 to be greater than the fuel injection amount in a case in which the post-injection is performed in every combustion cycle in all the cylinders 11. The injection-valve controller 42b performs the post-injection control such that the number of times of the post-injection is less than the number of times in a case in which the post-injection is performed in every combustion cycle in all the cylinders 11. This can prevent the fuel injection amount for single-time post-injection from becoming excessively small. As described above herein, in general, in the control of the fuel injection valves 12, it is difficult to accurately control an excessively small fuel injection amount. Accordingly, by preventing the fuel injection amount for single-time post-injection from becoming excessively small, the fuel injection amount for the post-injection can be accurately controlled. That is, the fuel injection amount for the post-injection can be prevented from becoming excessively large or excessively small.

In addition, in the vehicle 1 according to this embodiment, the injection-valve controller 42b preferably stops the post-injection in some combustion cycles during the post-injection control. Thus, the number of times of the post-injection during the post-injection control can be appropriately less than the number of times in a case in which the post-injection is performed in every combustion cycle in all the cylinders 11. Accordingly, it is possible to prevent the fuel injection amount for single-time post-injection from becoming excessively small, and the fuel injection amount for the post-injection can be accurately and appropriately controlled.

Furthermore, in the vehicle 1 according to this embodiment, during the post-injection control, the injection-valve controller 42b preferably performs the post-injection every plurality of cycles that are set. Thus, intervals between combustion cycles in which the in-cylinder pressures greatly increase owing to the post-injection unburned remaining gas can be made equal. Accordingly, since the rotation fluctuation of the engine 10 can be made periodic, a driver can be prevented from feeling strange by the rotation fluctuation of the engine 10.

In addition, in the vehicle 1 according to this embodiment, the injection-valve controller 42b preferably stops the post-injection in some cylinders 11 in each combustion cycle during the post-injection control. Thus, the number of times of the post-injection during the post-injection control can be appropriately less than the number of times in a case in which the post-injection is performed in every combustion cycle in all the cylinders 11. Accordingly, it is possible to prevent the fuel injection amount for single-time post-injection from becoming excessively small, and the fuel injection amount for the post-injection can be accurately and appropriately controlled. Furthermore, since the period of fluctuation of the in-cylinder pressures can be made shorter, the number of vibrations of the in-cylinder pressures can be increased with respect to the characteristic vibration of the engine 10 or various parts attached to the engine 10. Accordingly, the rotation fluctuation of the engine 10 can be suppressed.

Furthermore, in the vehicle 1 according to this embodiment, the injection-valve controller 42b preferably stops the post-injection in the same cylinders 11 in each combustion cycle during the post-injection control. Thus, intervals between timings at which the in-cylinder pressures greatly increase owing to the post-injection unburned remaining gas can be made equal. Accordingly, since the rotation fluctuation of the engine 10 can be made periodic, a driver can be prevented from feeling strange by the rotation fluctuation of the engine 10.

Although the embodiment of the disclosure has been described above with reference to the appended drawings, the disclosure is not limited to the above embodiment. Needless to say, various modifications and alterations within the scope defined the claims are also included in the technical scope of the disclosure.

For example, although the engine 10 described above is a horizontally opposed engine including four cylinders, the engine according to an embodiment of the present disclosure is not limited to the above example. For example, the engine according to an embodiment of the present disclosure may be an engine including any number of cylinders, such as six cylinders, eight cylinders, or twelve cylinders. In addition, for example, the engine according to an embodiment of the present disclosure may alternatively be an engine other than a horizontally opposed engine (e.g., V engine or inline engine). Furthermore, although the engine 10 described above is a gasoline engine, the engine according to an embodiment of the present disclosure may alternatively be a diesel engine.

In addition, for example, although the purpose of the post-injection in the example described above is to recover the cleaning performance of the NOx adsorber catalyst 32b, the purpose of the post-injection may be to recover the cleaning performance of another catalyst (e.g., catalyst for cleaning particulate matter (PM)) other than the NOx adsorber catalyst 32b in the exhaust cleaner 32.

Furthermore, for example, the process described with reference to the flowchart herein is not necessarily performed in the order illustrated in the flowchart. In addition, an additional step may be employed in the process, and a step may be skipped in the process.

The control device 40 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 40 including the determiner 41 and the controller 42. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle comprising:
   an exhaust passage provided with an exhaust cleaner;
   an engine coupled to the exhaust passage;
   fuel injection valves respectively provided in cylinders of the engine and configured to inject fuel into the cylinders; and
   a control device configured to perform post-injection control that causes the fuel injection valves to perform post-injection to be performed after the main-injection, the post-injection control being performed over a plurality of combustion cycles, the plurality of combustion cycles including first, second, third, and fourth combustion cycles in sequential order, the post-injection control including a first post-injection control and a second post-injection control,
   wherein, in the first post-injection control, the control device causes each of the fuel injection valves to perform the post-injection during the first and fourth combustion cycles and to refrain from performing the post-injection during the second and third combustion cycles, and wherein the control device determines a fuel injection amount for each of the fuel injection valves for performing the post-injection in the first post-injection control to be greater than a fuel injection amount for each of the fuel injection valves for performing the post-injection in normal post-injection control in which each of the fuel injection valves performs the post-injection in each of the plurality of combustion cycles.

2. The vehicle according to claim 1, wherein the post-injection control further includes a second post-injection control different from the first post-injection control, wherein, in the second post-injection control, the control device causes one or more fuel injection valves of the fuel injection valves but not all of the fuel injection valves to perform the post-injection during each of the plurality of combustion cycles, and wherein the control device determines a fuel injection amount for each of the one or more fuel injection valves for performing the post-injection in the second post-injection control to be greater than the fuel injection amount for each of the fuel injection valves for performing the post-injection in the normal post-injection control in which each of the fuel injection valves performs the post-injection in each of the plurality of combustion cycles.

3. A vehicle comprising:
an exhaust passage provided with an exhaust cleaner;
an engine coupled to the exhaust passage;
fuel injection valves respectively provided in cylinders of the engine and configured to inject fuel into the cylinders; and
circuitry configured to perform post-injection control that causes the fuel injection valves to perform post-injection to be performed after the main-injection, the post-injection control being performed over a plurality of combustion cycles, the plurality of combustion cycles including first, second, third, and fourth combustion cycles in sequential order, the post-injection control including a first post-injection control and a second post-injection control, wherein, in the first post-injection control, the circuitry causes each of the fuel injection valves to perform the post-injection during the first and fourth combustion cycles and to refrain from performing the post-injection during the second and third combustion cycles, and wherein the circuitry determines a fuel injection amount for each of the fuel injection valves for performing the post-injection in the first post-injection control to be greater than a fuel injection amount for each of the fuel injection valves for performing the post-injection in normal post-injection control in which each of the fuel injection valves performs the post-injection in each of the plurality of combustion cycles.

4. The vehicle according to claim 3, wherein the post-injection control further includes a second post-injection control different from the first post-injection control, wherein, in the second post-injection control, the circuitry causes one or more fuel injection valves of the fuel injection valves but not all of the fuel injection valves to perform the post-injection during each of the plurality of combustion cycles, and wherein the circuitry determines a fuel injection amount for each of the one or more fuel injection valves for performing the post-injection in the second post-injection control to be greater than the fuel injection amount for each of the fuel injection valves for performing the post-injection in the normal post-injection control in which each of the fuel injection valves performs the post-injection in each of the plurality of combustion cycles.

* * * * *